United States Patent
Gianone et al.

(10) Patent No.: US 8,360,915 B2
(45) Date of Patent: Jan. 29, 2013

(54) AXLE

(75) Inventors: Roberto Gianone, Barengo (IT); Chiara Cesari, Novara (IT); Marco Bassi, Novate Milanese (IT); Marco Fratelli, Vigevanoo (IT); Stefano Martinello, Galliate (IT)

(73) Assignee: Meritor Technology, Inc., Troy, MI (US)

( * ) Notice: Subject to any disclaimer, the term of this patent is extended or adjusted under 35 U.S.C. 154(b) by 165 days.

(21) Appl. No.: 12/824,501

(22) Filed: Jun. 28, 2010

(65) Prior Publication Data

US 2010/0331134 A1    Dec. 30, 2010

(30) Foreign Application Priority Data

Jun. 30, 2009    (GB) .................................. 0911278.0

(51) Int. Cl.
   *F16H 57/04*    (2010.01)
(52) U.S. Cl. ........................................ 475/160; 475/159
(58) Field of Classification Search .................. 475/159, 475/160; 74/606, 607; 184/6.12

See application file for complete search history.

(56) References Cited

U.S. PATENT DOCUMENTS

| | | | | |
|---|---|---|---|---|
| 3,625,310 A | * | 12/1971 | Herrick | ........................ 184/6.12 |
| 3,847,249 A | | 11/1974 | Oehring | |
| 4,095,675 A | * | 6/1978 | Bell | ............................. 184/6.12 |
| 6,299,561 B1 | | 10/2001 | Kramer et al. | |
| 6,843,746 B2 | | 1/2005 | Hayes et al. | |
| 2005/0245342 A1 | | 11/2005 | Pontanari et al. | |
| 2009/0173184 A1 | | 7/2009 | Beutler et al. | |

FOREIGN PATENT DOCUMENTS

| | | |
|---|---|---|
| DE | 10245791 A1 | 4/2004 |
| EP | 1004799 A2 | 5/2000 |
| EP | 1918613 A2 | 5/2008 |

OTHER PUBLICATIONS

United Kingdom Search Report for GB0911278.0 mailed on Oct. 23, 2009.

* cited by examiner

*Primary Examiner* — David D Le
*Assistant Examiner* — Colby M Hansen
(74) *Attorney, Agent, or Firm* — Carlson, Gaskey & Olds, PC

(57) ABSTRACT

An axle has a central crown wheel receiving portion with a pinion side and an opposite side. The opposite side is defined by a first crown wheel bowl for receiving a part of a crown wheel, the first crown wheel bowl having a peripheral edge. The axle includes a second crown wheel bowl for receiving the part of the crown wheel. The second crown wheel bowl is nested with the first crown wheel bowl and is attached to the first crown wheel bowl at a peripheral edge to define a reservoir.

23 Claims, 5 Drawing Sheets

AXLE

REFERENCE TO RELATED APPLICATION

This application claims priority to United Kingdom Application No. GB 0911278.0 filed Jun. 30, 2009.

BACKGROUND OF THE INVENTION

The present invention relates to an axle.

Driven axles for automotive vehicles are known whereby a drive shaft aligned generally longitudinally relative to the vehicle drives a pinion which is in meshing engagement with a crown wheel in an axle housing. The crown wheel drives a right hand drive shaft connected to a right hand wheel and also drives a left hand drive shaft connected to a left hand wheel, thereby propelling the vehicle. Typically, the crown wheel will drive the right and left hand drive shafts via a differential assembly.

Oil is provided in the axle housing for lubricating and cooling the crown wheel, a pinion, differential gears and associated bearings. However, the rotation of the crown wheel, the pinion and the differential housing in the oil leads to power losses due to oil churning, thereby increasing the overall fuel consumption of the vehicle.

U.S. Pat. No. 6,299,561 shows a crown wheel which, as it rotates, splashes oil over a wall of the associated housing. A hole in the lower portion of the wall allows oil to drain back to an area where it can again lubricate the crown wheel. However, the wall is a complicated structure to manufacture.

EP 1918613 shows a pre-fabricated shield fitted around at least a portion of the crown wheel. Oil is splashed out of the region around the crown wheel into another part of the axle housing, and the shield prevents the oil returning to a region where it can lubricate the crown wheel. A valve can be selectively opened to allow oil back into the region around the crown wheel under certain circumstances. However, the shield acts to isolate the crown wheel from other components in the axle including the axle tubes. In other words, the axle tubes are fluidly connected with a region outside the shield. In order to prevent excessive amounts of oil travelling down the axle tube, the oil level outside the shield is below a level of the bottom of an axle tube.

SUMMARY OF THE INVENTION

An oil reservoir is disclosed that is easy to manufacture and which has a relatively large capacity. There is provided an axle having a crown wheel receiving portion with a pinion side and an opposite side. The opposite side is defined by a first crown wheel bowl for receiving a part of a crown wheel, the first crown wheel bowl having a peripheral edge. The axle includes a second crown wheel bowl for receiving the part of the crown wheel. The second crown wheel bowl is nested with the first crown wheel bowl and is attached to the first crown wheel bowl at the peripheral edge to define a reservoir.

The first crown wheel bowl can be substantially dome shaped. The peripheral edge can be substantially circular. The second crown wheel bowl can have a first recess and a second recess positioned within the first recess. The first recess can be substantially circular. The second recess can be trough like. The second recess can be in the form of an arcuate trough.

The reservoir can have a central region, and a part of the first crown wheel bowl is generally parallel to and spaced from a part of the second crown wheel bowl by a relatively small distance. The reservoir has a first lateral region where a part of the first crown wheel bowl is spaced from a part of the second crown wheel bowl by a relatively large distance. The reservoir can have a second lateral region where a part of the first crown wheel bowl is spaced from a part of the second crown wheel bowl by a relatively large distance. The reservoir can have an inlet defined by the second crown wheel bowl, and in one example, the inlet is in line with a splash zone defined by oil flung from the rotating crown wheel. The inlet can be in line with the crown wheel. The inlet can be in line with teeth of the crown wheel. The inlet can be defined by a scoop facing away from the axis of rotation of the crown wheel. The reservoir can be an outlet defined by the second crown wheel bowl.

The outlet can include a selectively openable valve. The outlet can be at the bottom of the central region. The valve can include a closure which blocks the outlet when the valve is closed, and the closure is positioned in the reservoir when the valve is open.

An actuator can be mounted on the first crown wheel bowl that operates the valve. The actuator can be air operated. The actuator can be biased to a position corresponding to an open position of the valve. The application of air pressure to the actuator can move it to a position corresponding to a closed position of the valve.

A method of altering a lubricant level around a crown wheel includes the steps of providing an axle having a crown wheel receiving portion with a pinion side and an opposite side. The opposite side is defined by a first crown wheel bowl for receiving a part of a crown wheel, the first crown wheel bowl having a peripheral edge. The axle includes a second crown wheel bowl for receiving the part of the crown wheel, and the second crown wheel bowl is nested with the first crown wheel bowl and is attached to the first crown wheel bowl at the peripheral edge to define a lubricant reservoir. The axle has a sump for receiving a part of the crown wheel. The method includes the steps of selectively transferring lubricant from the sump to the reservoir to lower the level of lubricant around the crown wheel and selectively transferring lubricant from the reservoir to the sump to raise the level of lubricant around the crown wheel.

BRIEF DESCRIPTION OF THE DRAWINGS

The present invention will now be described, by way of example only, with reference to the accompanying drawings wherein.

DETAILED DESCRIPTION OF THE PREFERRED EMBODIMENT

Figure 1:
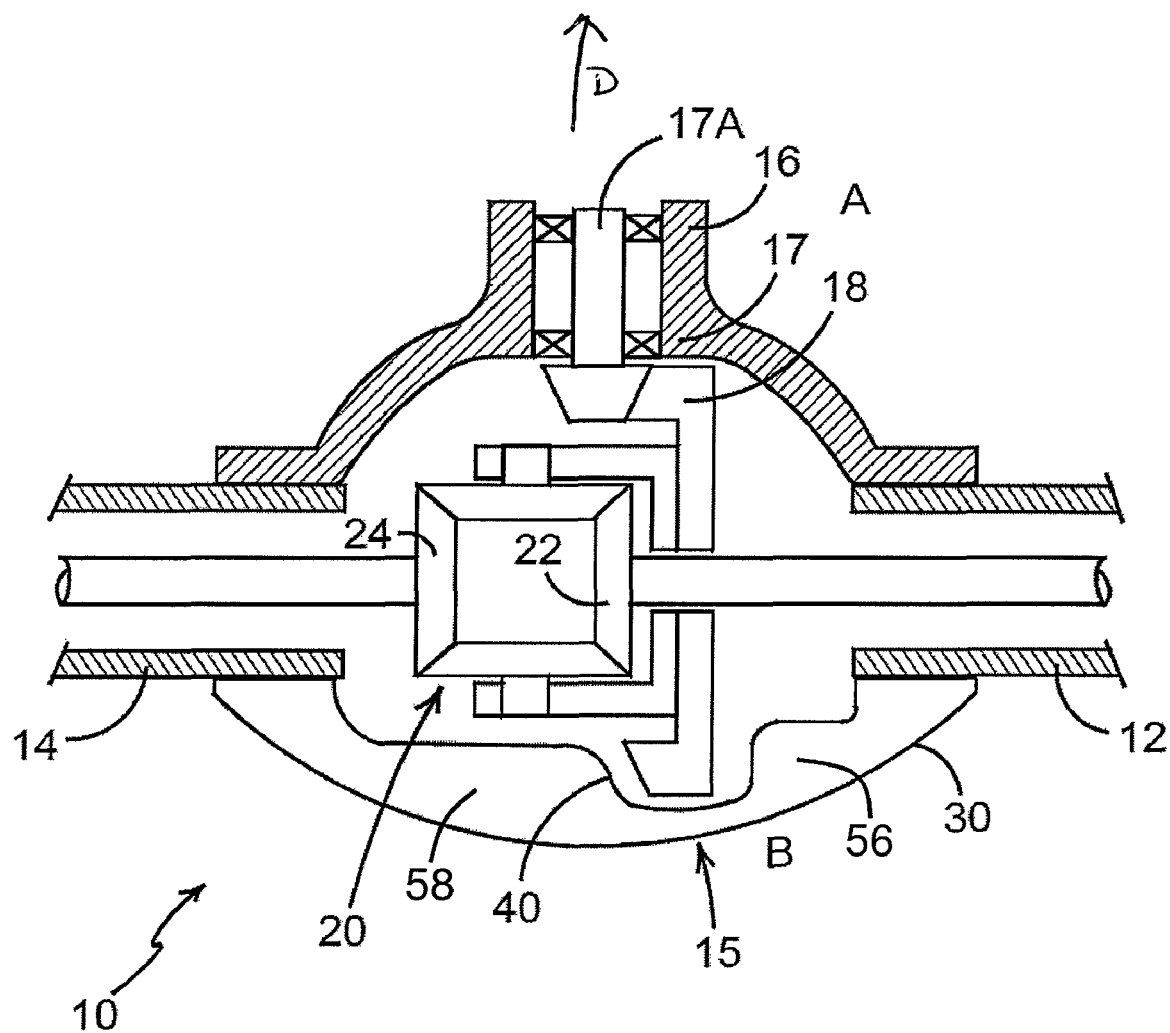
FIG. 1 is a top schematic cross section view of an axle according to the present invention.

FIG. 1 shows an axle 10 (only part of which is shown) having a right axle tube 12 and a left axle tube 14. The axle 10 has a pinion side A and an opposite side B, as shown in FIG. 1. In this case, the axle 10 is a rear axle, and the pinion side A is on the front side of the axle 10 and the opposite side B is on the rear side of the axle 10. In further embodiments, axles 10 according to the present invention may be front axles being driven by a drive shaft located behind the axle 10, in which case the pinion side of the axle 10 will be the rear side, and the opposite side of the axle 10 will be the front side. Between axle tubes 12 and 14 is a crown wheel receiving portion 15 of the axle 10.

The axle 10 includes a front pinion bearing housing 16 and a rear pinion bearing housing 17. A pinion 17A is rotatably mounted in bearings mounted in the bearing housings 16 and 17. The pinion 17A drives a crown wheel 18, which in turn drives a differential assembly 20. The differential assembly 20 includes a right differential gear 22 which receives a right half shaft, which in turn drives the right wheel (not shown). The differential assembly 20 also includes a left differential gear 24 which receives a left half shaft, which is received in the left axle tube 14 and drives a left wheel (not shown).

Figure 2:
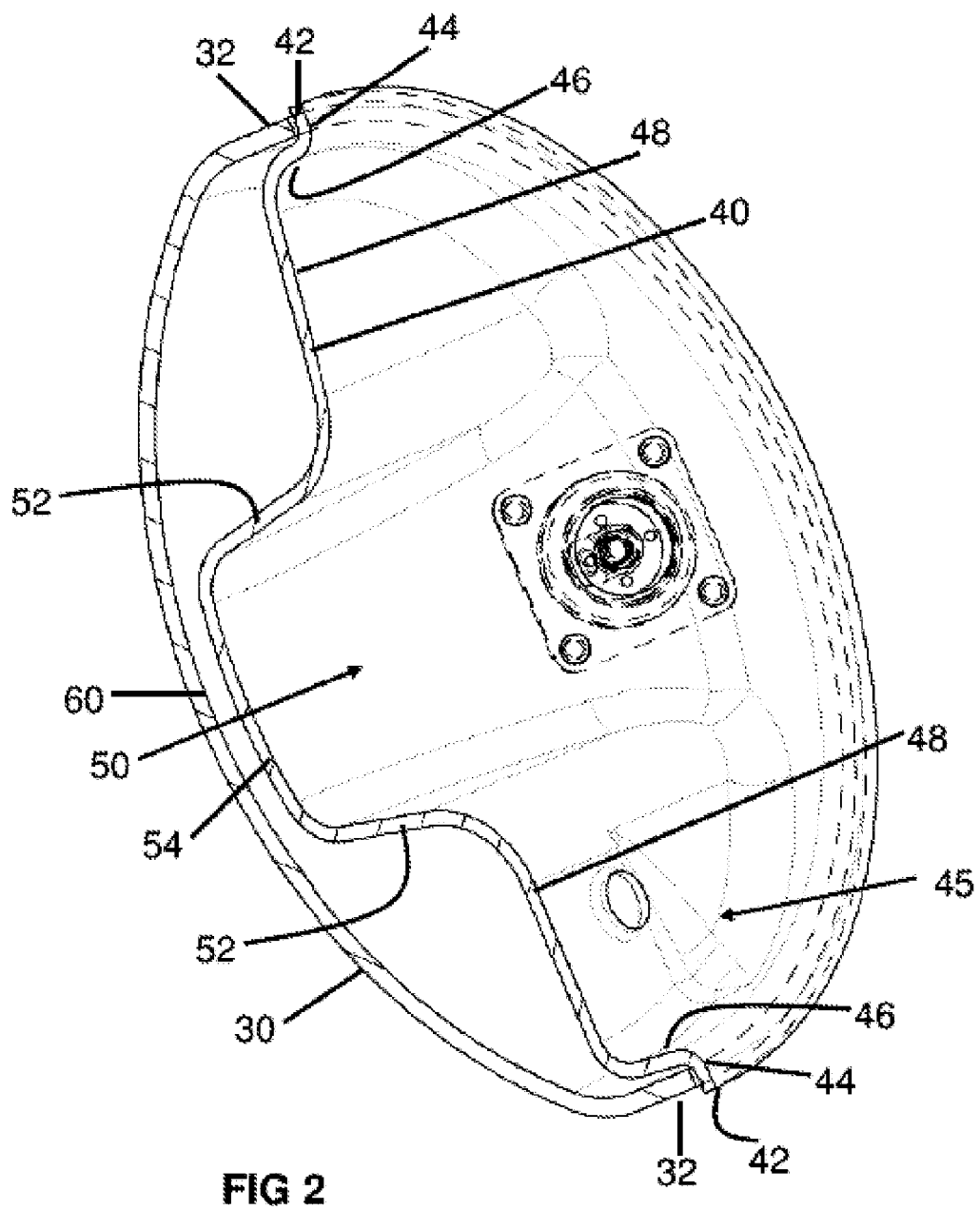
FIGS. 2 and 3 are asymmetric views of crown wheel bowls of FIG. 1.
Figure 3:
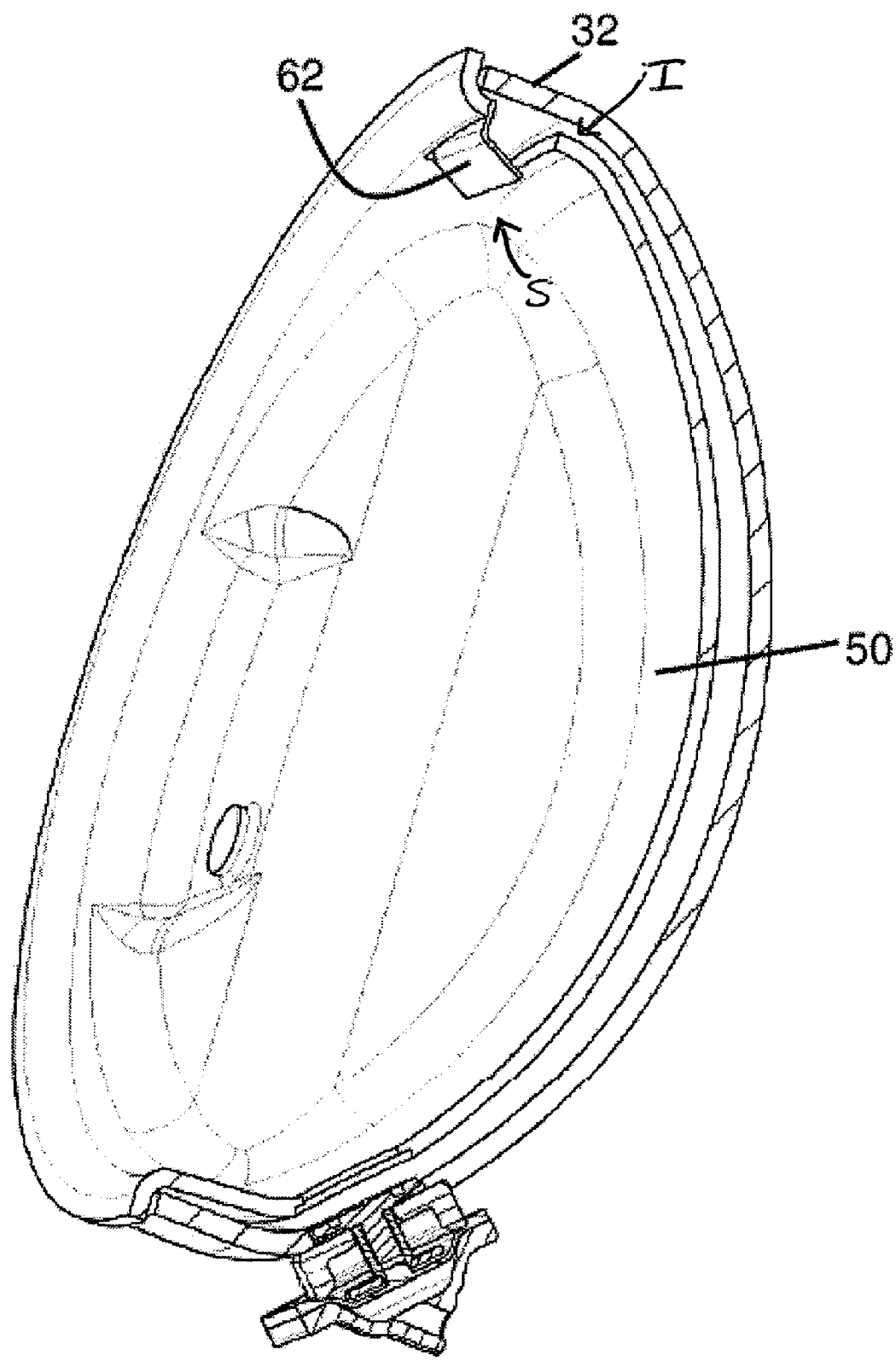
Figure 4:
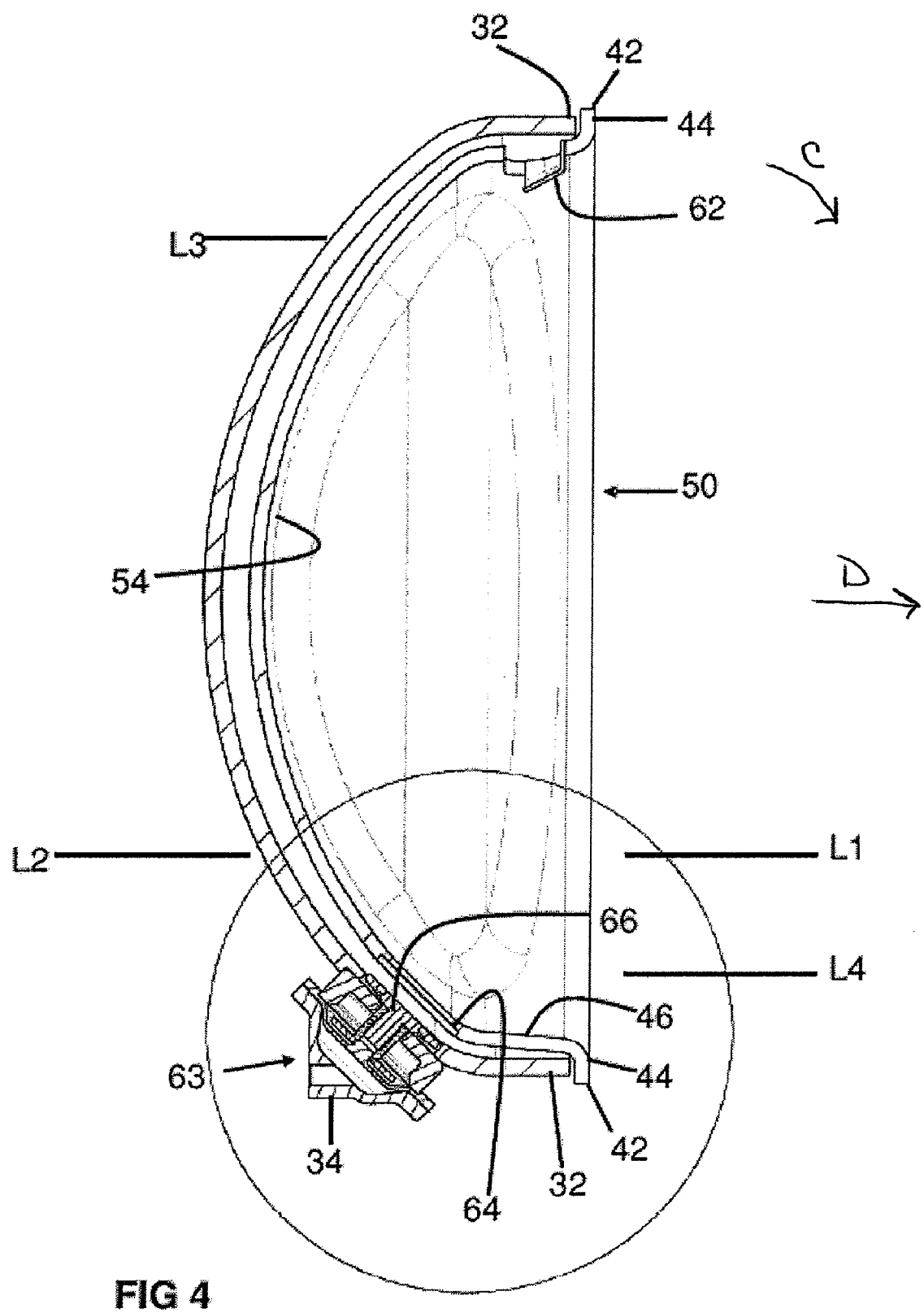
FIG. 4 is a side cross section view of the crown wheel bowls of FIG. 1.

Attached to the rear (opposite side B) of the axle 10 is a first crown wheel bowl 30 and a second crown wheel bowl 40 (best seen in FIGS. 2, 3 and 4). The first crown wheel bowl 30 is circular in rear view and is substantially dome shaped. The first crown wheel bowl 30 includes a peripheral edge 32, which is circular. Mounted on the bottom of the first crown wheel bowl 30 is an air actuator 34 which operates a valve closure, as will further be described below.

The first crown wheel bowl 30 is a pressed component, in this case, a pressed steel component. In further embodiments, alternative materials, and in particular alternative manufacturing methods, could be used to make the first crown wheel bowl 30.

The second crown wheel bowl 40 has a peripheral edge 42 and forms part of a flat annular flange 44. The peripheral edge 42 and the annular flange 44 are both circular. Adjacent to the annular flange 44 is an annular first recess wall 46, which is connected to a generally circular first recess base 48. The first recess wall 46 and the first recess base 48 define a first recess 45. Positioned within the first recess 45 is a second recess 50 which is trough like, in particular in the form of an arcuate trough having trough walls 52 and a trough base 54.

As can be seen in FIGS. 2, 3 and 4, the second crown wheel bowl 40 is nested inside the first crown wheel bowl 30. The peripheral edge 32 of the first crown wheel bowl 30 is attached (for example, by welding) to the annular flange 44 of the second crown wheel bowl 40. The annular flange 44 of the second crown wheel bowl 40 is attached (for example, by welding) to the rest of the axle 10. The first crown wheel bowl 30 and the second crown wheel bowl 40 therefore define a reservoir 26. As can be seen in FIGS. 1 and 4, the trough base 54 sits close to and is generally parallel with an adjacent central portion of the first crown wheel bowl 30. As is best seen in FIG. 1, a right hand reservoir region 56 is provided where a region of the first crown wheel bowl 30 is spaced from an adjacent region of the second crown wheel bowl 40. A left hand reservoir region 58 is provided where a portion of the first crown wheel bowl 30 is spaced from an adjacent portion of the second crown wheel bowl 40. Thus, the main oil holding regions of the reservoir 26 are the right hand reservoir region 56 and the left hand reservoir region 58. A central arcuate region 60 of the reservoir 26 as defined between the trough base 54 and the adjacent region of the first crown wheel bowl 30 holds a relatively small amount of oil, though it does act as a communication channel between the right hand reservoir region 56 and the left hand reservoir region 58 and also between the inlet and outlet, as will further be described below.

At the top of the second crown wheel bowl 40, there is a scoop 62 with an open side that faces rearward i.e., the open side of the scoop 62 faces away from the rotational axis of the crown wheel 18 because the rotational axis of the crown wheel 18 is in front of the scoop 62.

When the vehicle is being driven in the forward direction D (see FIG. 1), the crown wheel 18 rotates in a clockwise direction as shown by arrow C of FIG. 4. Oil sitting in the lower portion of the crown wheel receiving portion 15 of the axle 10, and oil sitting in the lower portion of the first recess 45, is collected by the crown wheel 18 and is flung and splashed in the clockwise direction C. Certain of the oil will enter the scoop 62 and then drain into either the right hand reservoir region 56 or the left hand reservoir region 58 via an inlet I, thereby progressively filling the reservoir 26. At the bottom of the second crown wheel bowl 40, there is an outlet hole 64, which is selectively openable and closable by a valve closure 66.

Figure 5:
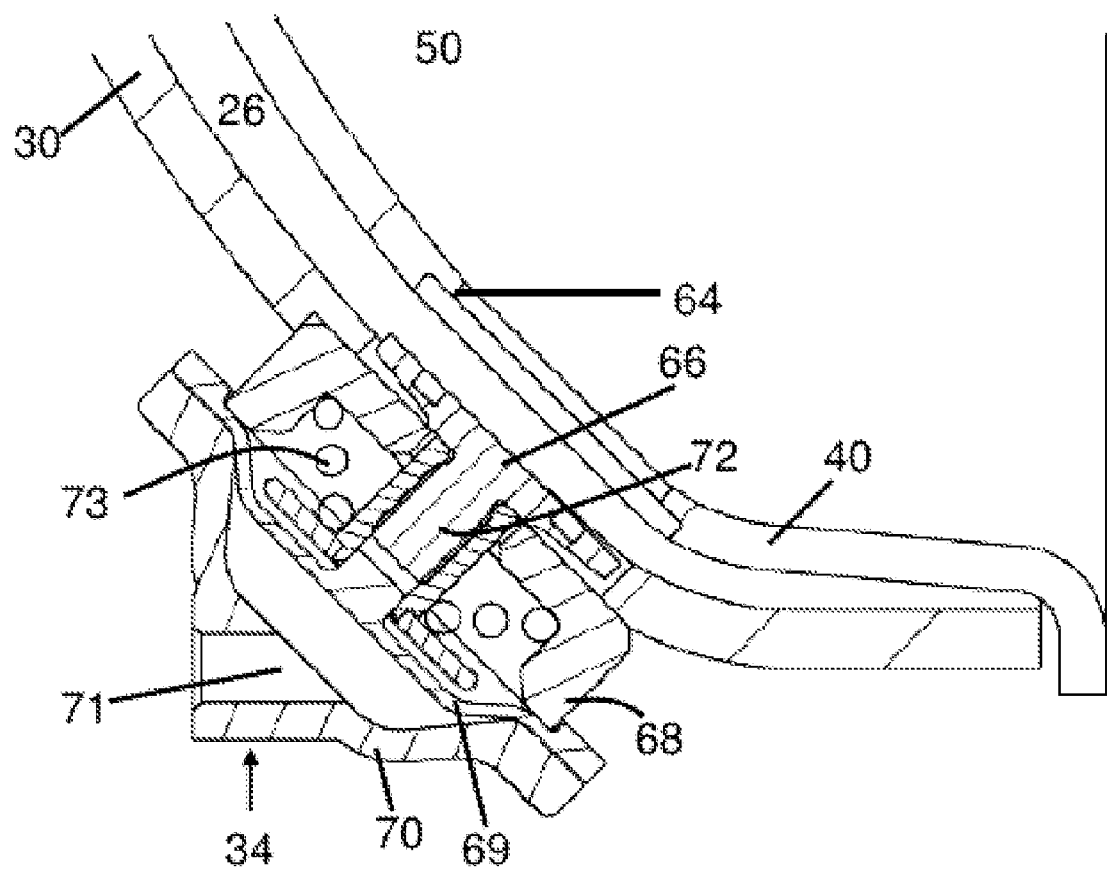
FIG. 5 is a close up view of part of FIG. 4.

FIG. 5 shows the air actuator 34, the valve closure 66 and associated components in more detail. As mentioned above, the air actuator 34 is mounted on the first crown wheel bowl 30. The air actuator 34 includes a first body portion 68, a diaphragm 69 and a second body portion 70 having an air inlet 71. The diaphragm 69 is connected to a rod 72 on which the valve closure 66 is mounted. The valve closure 66 together with the outlet hole 64 define a valve 63. A spring 73 biases the diaphragm 69 to the left when viewing FIG. 5 and hence tends to open the valve 63, i.e., it moves the valve closure 66 away from the outlet hole 64, thereby allowing any oil in the reservoir 26 to flow into a region around the crown wheel 18. When it is required to close the valve 63, air is applied via the air inlet 71, which acts on the left hand side of the diaphragm 69 and moves the diaphragm 69 to the right, thereby compressing the spring 73 and moving the closure 66 into the outlet hole 64, thereby closing the valve 63, preventing oil from flowing from the reservoir 26 to a region surrounding the crown wheel 18.

As is best seen in FIG. 1, the first crown wheel bowl 30 receives a portion of the crown wheel 18, in particular the rear most portion of the crown wheel 18. Similarly, the second crown wheel bowl 40, and in particular the second recess 50, also receives the same part of the crown wheel 18.

The operation of the device is as follows. With the vehicle stationary and the valve 63 open, the oil level in the reservoir 26 will settle to the same level as the oil surrounding the crown wheel 18, i.e., the oil surrounding the crown wheel 18 will reach a level L1, and the oil level in the reservoir 26 will reach a level L2 equivalent to the level L1.

The engine of the vehicle is then started, and air pressure is applied to the diaphragm 69 via the air inlet 71, thereby closing the valve 63. At this stage, the oil level surrounding the crown wheel 18 is still the level L1, and the oil level in the reservoir 26 is still the level L2.

The vehicle then drives off, causing the crown wheel 18 to rotate in the direction of the arrow C and hence throwing oil into the scoop 62 and progressively filling the reservoir 26, thereby dropping the oil level around the crown wheel 18. Ultimately, the reservoir 26 will become full of oil i.e., the oil level will reach a level L3. At this stage, the oil level surrounding the crown wheel 18 will be at a level L4.

A control mechanism is operable to apply air pressure to the diaphragm 69 or to vent that air pressure. In the event that arduous driving conditions are encountered, for example the vehicle is driving up a hill and is fully laden, the control mechanism vents the air out of the air inlet 71, which allows the spring 73 to push the diaphragm 69 to the left as shown in FIG. 5, thereby opening the valve 63 and allowing oil to drain from the reservoir 26 into the region around the crown wheel 18. The oil level around the crown wheel 18 will then increase to a level slightly below the L1 level, and the oil level in the reservoir 26 will fall to a level slightly below the L2 level. Note that while the vehicle is moving, there will always be an amount of oil splashed around within the axle 10 and hence, when the valve 63 is open, the oil level around the crown wheel 18 will be slightly lower than the level L1, and the oil level in the reservoir 26 will be slightly lower, by an equal amount, than the level L2.

Once the vehicle comes to rest with the valve 63 open, then the oil will drain from the surfaces of the axle housing, the crown wheel 18, the differential, etc., and the oil level will return to the levels L1 and L2.

As can be seen in FIG. 1, the rear most part of the crown wheel 18 is close to the trough base 54, within which the outlet hole 64 is positioned. The closure 66 is positioned within the reservoir 26 when the valve 63 is opened. This allows the trough base 54 to sit close to the crown wheel 18 without the need for a gap to accommodate the closure when the valve 63 is open.

Furthermore, the air actuator 34 is mounted on an opposite side of the reservoir 26 to the outlet hole 64, i.e., the air actuator 34 is mounted on the first crown wheel bowl 30, whereas the outlet hole 64 is mounted on the second crown wheel bowl 40. Providing the first crown wheel bowl 30 close to the second crown wheel bowl 40 in this region of the actuator and valve closure allows the air actuator 34 to be mounted on the first crown wheel bowl 30 and operate a valve which closes a hole in the second crown wheel bowl 40, without the air actuator 34 being overly large.

The lateral extent of the scoop 62 covers the splash zone S created by the rotating crown wheel 18. In an alternative embodiment, the lateral extent of the scoop 62 could be in line with the crown wheel 18, and in a further embodiment, the lateral extent of the scoop 62 could be in line with the teeth of the crown wheel 18.

As shown in FIG. 5, the spring 73 acts to bias the valve 63 open. In further embodiments, alternative systems could be used to bias the valve 63 open, for example, elastomeric devices could be used to bias the valve 63 open, or alternatively different shapes of the spring 73 can be used to bias the valve 63 open. In further embodiments, a bias device could act directly on the valve 63 to bias it open. Alternatively, a bias device could act directly on the air actuator 34 to bias the air actuator 34 to a position corresponding to an open position of the valve 63.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An axle comprising:
a crown wheel receiving portion with a pinion side and an opposite side;
a first crown wheel bowl, wherein the opposite side of the crown wheel receiving portion is defined by the first crown wheel bowl for receiving a part of a crown wheel, and the first crown wheel bowl has a peripheral edge;
a second crown wheel bowl for receiving the part of the crown wheel, wherein the second crown wheel bowl is nested with the first crown wheel bowl and attached to the first crown wheel bowl at the peripheral edge to define a lubricant reservoir; and
wherein the lubricant reservoir has an inlet defined by the combination of the second crown wheel bowl and a scoop that faces away from an axis of rotation of the crown wheel.

2. The axle as defined in claim 1 wherein the reservoir includes an outlet.

3. The axle as defined in claim 2 wherein the outlet is defined by the second crown wheel bowl.

4. The axle as defined in claim 2 wherein the outlet is opened and closed by a selectively openable valve.

5. The axle as defined in claim 4 wherein the valve includes a closure which blocks the outlet when the valve is closed, and the closure is positioned in the reservoir when the valve is open.

6. The axle as defined in claim 4 wherein the valve is biased to an open position by a bias device.

7. The axle as defined in claim 4 wherein an actuator is mounted on the first crown wheel bowl and operates the valve.

8. The axle as defined in claim 7 wherein the actuator is air operated.

9. The axle as defined in claim 8 wherein the actuator is biased to a position corresponding to an open position of the valve.

10. The axle as defined in claim 9 wherein application of air pressure to the actuator moves the actuator to a position corresponding to a closed position of the valve.

11. The axle as defined in claim 1 wherein the inlet is radially aligned with the crown wheel.

12. The axle as defined in claim 1 wherein the second crown wheel bowl includes a first recess and a second recess positioned within the first recess.

13. The axle as defined in claim 12 wherein the first recess is substantially circular.

14. The axle as defined in claim 12 wherein the second recess is trough like.

15. The axle as defined in claim 14 wherein the second recess is in the form of an arcuate trough.

16. The axle as defined in claim 1 wherein said scoop extends into an internal cavity defined by the second crown wheel bowl.

17. The axle as defined in claim 1 wherein said scoop is configured to have an open side that scoops lubricant into the lubricant reservoir, and wherein the open side faces away from an axis of rotation of the crown wheel.

18. An axle comprising:
a crown wheel receiving portion with a pinion side and an opposite side, the opposite side being defined by a first crown wheel bowl for receiving a part of a crown wheel, the first crown wheel bowl having a peripheral edge and the crown wheel defining an axis of rotation;
a second crown wheel bowl for receiving said part of the crown wheel, the second crown wheel bowl being nested with the first crown wheel bowl and being attached to the first crown wheel bowl at the peripheral edge to define a lubricant reservoir; and
wherein the lubricant reservoir has an inlet defined by the combination of the second crown wheel bowl and a scoop that faces the opposite side and wherein the axis of rotation of the crown wheel is on the pinion side of the scoop.

19. The axle as defined in claim 18 wherein said scoop extends into an internal cavity defined by the second crown wheel bowl.

20. The axle as defined in claim 18 wherein said scoop is configured to have an open side that scoops lubricant into the lubricant reservoir, and wherein the open side faces the opposite side of the a crown wheel receiving portion.

21. An axle comprising:
a crown wheel receiving portion with a pinion side and an opposite side, the opposite side being defined by a first crown wheel bowl for receiving a part of a crown wheel, the first crown wheel bowl having a peripheral edge;
a second crown wheel bowl for receiving said part of the crown wheel, the second crown wheel bowl being nested with the first crown wheel bowl and being attached to the first crown wheel bowl at the peripheral edge to define a lubricant reservoir; and
wherein the pinion side defines a front side of the axle and the opposite side defines a rear side of the axle, and wherein the lubricant reservoir has an inlet defined by the combination of the second crown wheel bowl and a scoop wherein the scoop faces the rear side of the axle.

22. The axle as defined in claim 21 wherein said scoop extends into an internal cavity defined by the second crown wheel bowl.

23. The axle as defined in claim 21 wherein said scoop is configured to have an open side that scoops lubricant into the lubricant reservoir, and wherein the open side faces the rear side of the axle.

* * * * *